United States Patent [19]

Hanna et al.

[11] Patent Number: 5,222,094
[45] Date of Patent: Jun. 22, 1993

[54] RING LASER

[75] Inventors: David C. Hanna; William A. Clarkson, both of Hampshire, England

[73] Assignee: The Secretary of State for Defence in Her Britannic Majesty's Government of the United Kingdom of Great Britain and Northern Ireland, London, England

[21] Appl. No.: 777,239
[22] PCT Filed: Apr. 11, 1990
[86] PCT No.: PCT/GB90/00551
§ 371 Date: Nov. 13, 1991
§ 102(e) Date: Nov. 13, 1991
[87] PCT Pub. No.: WO90/12435
PCT Pub. Date: Oct. 18, 1990

[30] Foreign Application Priority Data

Apr. 12, 1989 [GB] United Kingdom ............... 8908304

[51] Int. Cl.⁵ .............................................. H01S 3/083
[52] U.S. Cl. ........................................ 372/94; 372/92; 372/66; 372/71; 372/108; 372/100; 359/669
[58] Field of Search ........................... 372/92-94, 372/66, 108, 71; 359/669

[56] References Cited

U.S. PATENT DOCUMENTS

| 3,657,733 | 4/1972 | Shapiro et al. | 372/94 |
| 4,623,225 | 11/1986 | Forkner | 359/669 |
| 4,739,507 | 4/1988 | Byer et al. | 372/94 |
| 4,764,933 | 8/1988 | Kozlovsky et al. | 372/92 |
| 4,797,896 | 1/1989 | Kane | 372/94 |
| 4,829,532 | 5/1989 | Kane | 372/93 |
| 5,007,065 | 4/1991 | Trutna, Jr. | 372/94 |
| 5,052,815 | 10/1991 | Nightingale | 372/94 |

FOREIGN PATENT DOCUMENTS 0355566 2/1990 European Pat. Off. ............. 372/94

Primary Examiner—Léon Scott, Jr.
Attorney, Agent, or Firm—Nixon & Vanderhye

[57] ABSTRACT

A ring laser (10) incorporates a laser rod (R) with end faces ($R_1$, $R_2$). The first face ($R_1$) is coated for high reflectivity at the laser wavelength and the second ($R_2$) for high transmission at this wavelength. The first face ($R_1$) provides one cavity end mirror, and a concave mirror ($M_1$) spaced apart from the rod (R) provides the other. A rhombic prism (P) between the rod (R) and mirror ($M_1$) defines differing (figure of eight) forward and return paths (14 to 17, 18 to 21) for cavity radiation passing from one end mirror ($R_1$ or $M_1$) to the other and returning. The prism (P) presents Brewster's angle refracting surfaces. The second rod face ($R_2$) is tilted to produce an optical path in two planes. A magnetic field (B) along the rod axis ($R_a$) produces Faraday rotation of polarization. This counteracts rotation arising from non-coplanar optics for one direction of propagation around the laser cavity (10) but not the other. This produces unidirectional laser action.

9 Claims, 5 Drawing Sheets

RING LASER

BACKGROUND OF THE INVENTION

1. Field of the Invention

This invention relates to a ring laser.

2. Discussion of Prior Art

Ring lasers are described in for example British Patent No. 1,237,255, British Patent Appln. No. 2,030,760A and European Patent Appln. No. 0,071,007 (equivalent to U.S.A. Pat. No. 4,556,320). These documents generally speaking disclose lasers having triangular optical paths defined by a respective reflector (mirror or prism) at each triangle apex. In each case, the laser medium is located between two reflectors in a position corresponding to one side of the relevant triangle. The lasers are employed as rotation sensors. Two counter-rotating beams pass round the triangle in each case. Rotation of a ring laser about its central axis perpendicular to its plane sets up a beat frequency in the laser output proportional to the rotation rate. This arises because one counter-rotating beam is affected differently to the other.

Ring lasers with triangular paths suffer from the disadvantage of difficulty of alignment. It is necessary to position three mirrors (or other reflecting devices) so that reflection is from a first mirror to a second, from the second to a third, from the third back to the first and so on along the same path round the ring once more. If one mirror is misaligned, there is no laser beam to detect and no means of identifying which mirror requires adjustment. The arrangement does not lend itself to a straightforward alignment procedure. Similar remarks apply to ring lasers employing four or more mirrors to define square or figure-of-eight optical geometry.

Another form of ring laser, the unidirectional ring laser, is disclosed in U.S. Pat. No. 4,578,793 to Kane et al and also by Trutna et al in Optics Letters, Vol 12, page 248, April 1987. This form of laser operates in an entirely different way. It is arranged to generate only one beam, not two. Its purpose is to avoid the formation of standing waves. The reason for this is as follows. A conventional laser produces a standing wave pattern within its cavity, and within its laser medium in particular. At the antinodes of the standing wave pattern, where light intensity is high, the laser medium gain is depleted. However, the gain is depleted very little in the regions of standing wave pattern nodes. In consequence, gain depletion is inhomogeneous in the direction of the laser light path, i.e. longitudinally of the laser medium. This is commonly referred to as "spatial hole burning". The undepleted gain regions remain capable of supporting laser action. Consequently, the laser outputs more than one longitudinal mode; i.e. it has multiple output wavelengths. To overcome this problem, unidirectional ring lasers were developed. In such a laser, the optical losses are arranged to be higher for one beam rotation or propagation direction than for the other. The laser then operates in the lowest loss or highest gain mode only. Moreover, there is no standing wave pattern in the laser. Instead, a travelling wave propagates in one direction round the ring. Both Kane et al and Trutna et al (referred to above) disclose a unidirectional ring laser consisting of a monolithic Nd:YAG crystal block. Reflections occur at four surfaces of the block, one surface being curved and the others planar. The curved surface acts as a partially transmitting laser cavity end mirror through which a pump beam enters and an output beam exits. The laser light path within the block is from the curved surface to the first, second and third planar surfaces in succession and then back to the mirror. Total internal reflection occurs at the planar surfaces, each of which acts as a non-transmitting laser cavity mirror. The light path sections between the curved surface and the first and third planar surfaces lie in a plane. However, the light path section between the first and second planar surfaces is out of that plane, as is that between the second and third planar surfaces. The result of this is that light leaving the curved surface experiences a net rotation of polarization analogous to rotation by a half wave plate. It is reciprocal, in that the polarization rotation is independent of the direction of light propagation round the Nd:YAG laser block surfaces. A non-reciprocal rotation of polarization is also provided for by applying a magnetic field longitudinally of the laser block. The field direction is inclined equally to the light propagation directions to and from the curved or plane surfaces. The magnetic field produces polarization rotation by the Faraday effect, and rotation is in one sense or the reverse depending on direction of propagation. For one direction of light propagation round the ring laser, the reciprocal and non-reciprocal polarization rotations add, and for the other they subtract. The magnetic field magnitude is arranged to produce substantial cancellation of polarization rotation for one propagation direction round the ring. For this direction, optical losses at reflecting surfaces are slightly lower than for the other. Kane et al indicate a differential loss of at least 0.01%. This provides sufficient difference between the net laser gains of the two propagation directions to ensure that the laser oscillates in the higher gain propagation direction only. Since there is no counterpropagating wave the laser produces a travelling wave in the high gain propagation direction. In consequence, there is neither a standing wave pattern nor spatial hole burning, and only one longitudinal mode is supported.

Monolithic ring lasers such as those of Trutna et al and Kane et al are considerably smaller than the earlier triangular devices. Kane et al describe a device in which the laser block is 38 mm × 13 mm × 3 mm. This degree of compactness is desirable for convenience of interfacing with other opto-electronic devices and systems. However, against this, monolithic ring lasers suffer from the disadvantage that they are for practical purposes virtually impossible to adjust. After the monolithic laser block has been manufactured and the necessary four optical surfaces polished thereon, if the laser is not operative there will be no indication of what adjustment is required to remedy matters. A simple adjustment to the pump beam direction might be all that is required. Alternatively, one or more of the block optical surfaces might require repolishing at a new angle. This is an expensive and time consuming procedure for which success is not guaranteed.

A further disadvantage of prior art unidirectional ring lasers is that their monolithic construction does not allow for incorporation of intracavity components for important laser functions such as Q-switching and frequency doubling. In consequence, they are limited to low power, fundamental wavelength operation. High power, pulsed operation produced by Q-switching is a common requirement.

SUMMARY OF THE INVENTION

It is an object of the invention to provide an alternative form of ring laser.

The present invention provides a ring laser having a resonator cavity defined by two mirrors at mutually opposite ends of the cavity and a gain medium within the cavity characterised in that the laser also includes at least one prism arranged between the end mirrors to present low loss refracting surfaces to incident cavity radiation and to define differing forward and return paths through the prism for radiation propagating from one end mirror to the other and returning, the prism being adjustable relative to both mirrors.

For the purposes of this specification, the expression "ring laser" is to be construed broadly as including lasers with looped and figure of eight paths. It is employed to distinguish the invention from traditional lasers with two mirrors employed at normal incidence, and in which incident and reflected beams are coincident. Moreover, the expression "low loss refracting surfaces" shall include antireflection-coated surfaces and surfaces arranged for incidence at or near Brewster's angle, e.g. within 4° of Brewster's angle.

The invention provides the advantage that it is characterised by much greater ease of adjustment than prior art lasers, and may be constructed in compact form. Moreover, it may be manufactured from commonly available optical components. Ease of adjustment arises because the invention lends itself to successive approximation adjustment techniques. In one embodiment employing a single glass prism between the mirrors, the laser cavity is first aligned without the prism in a conventional manner. Subsequently the prism is inserted and simply rotated until laser action is re-established. When correctly aligned, the prism provides refracting surfaces arranged at least substantially at Brewster's angle with respect to incident radiation.

It is a further advantage of the invention that it lends itself to unidirectional operation. To achieve this, the laser incorporates means for producing reciprocal and non-reciprocal polarization rotations, the rotations being mutually counteracting for one propagation direction round the ring and cumulative for the other. The non-reciprocal rotation may be provided by a magnetic field acting on the laser gain medium and directed at equal inclinations to the forward and return paths. In this case the laser gain medium exhibits a Verdet constant of suitable magnitude. The reciprocal rotation is obtained by introducing a change of plane into the optical paths within the cavity. This may be achieved by the use of a laser rod gain medium with an inclined face at which refraction occurs within the laser cavity. Alternatively, the change of plane or non-planar optical path geometry may be achieved by tilting the prism.

The invention is also advantageous in that it is easily adapted for different functions. It may be operated in continuous wave or pulse (Q-switched) modes, and may be frequency doubled, simply by selection of prism optical properties.

The prism may be a rhombic prism arranged to define a figure of eight optical path between the laser end mirrors. It may be of an optically inactive material such as glass when continuous operation is required. It may alternatively be of electro-optic material for Q-switching purposes. In this case, the prism has electrodes connected to pulse-generating circuitry and is arranged to switch the cavity rapidly between non-lasing and lasing states.

The laser of the invention may incorporate two prisms arranged in series along the cavity. Radiation traverses the prisms in succession on both the forward and return paths. One prism may be arranged for Q-switching and the other for laser frequency doubling. They may be of like material with differing optic axis directions.

In an alternative embodiment, the laser of the invention is arranged for acousto-optic Q-switching. In this case it incorporates a prism of acousto-optic material such as lead molybdate, and means for launching acoustic waves in the prism.

BRIEF DESCRIPTION OF THE DRAWINGS

In order that the invention might be more fully understood, embodiments thereof will now be described, with reference to the accompanying drawings, in which.

DETAILED DESCRIPTION OF PREFERRED EMBODIMENTS

Figure 1:
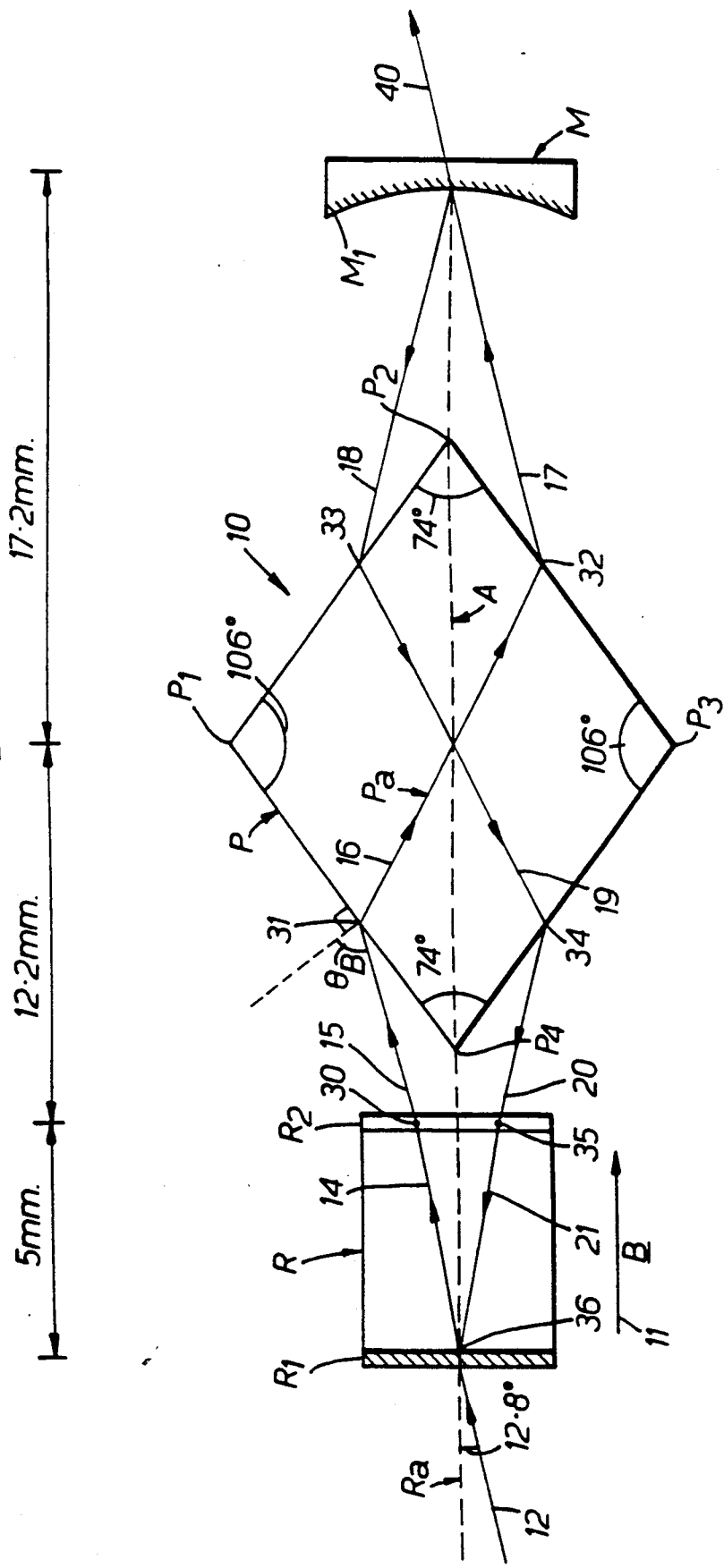
FIGS. 1 and 2 are respectively plan and side elevations of a ring laser of the invention illustrated schematically.
Figure 2:
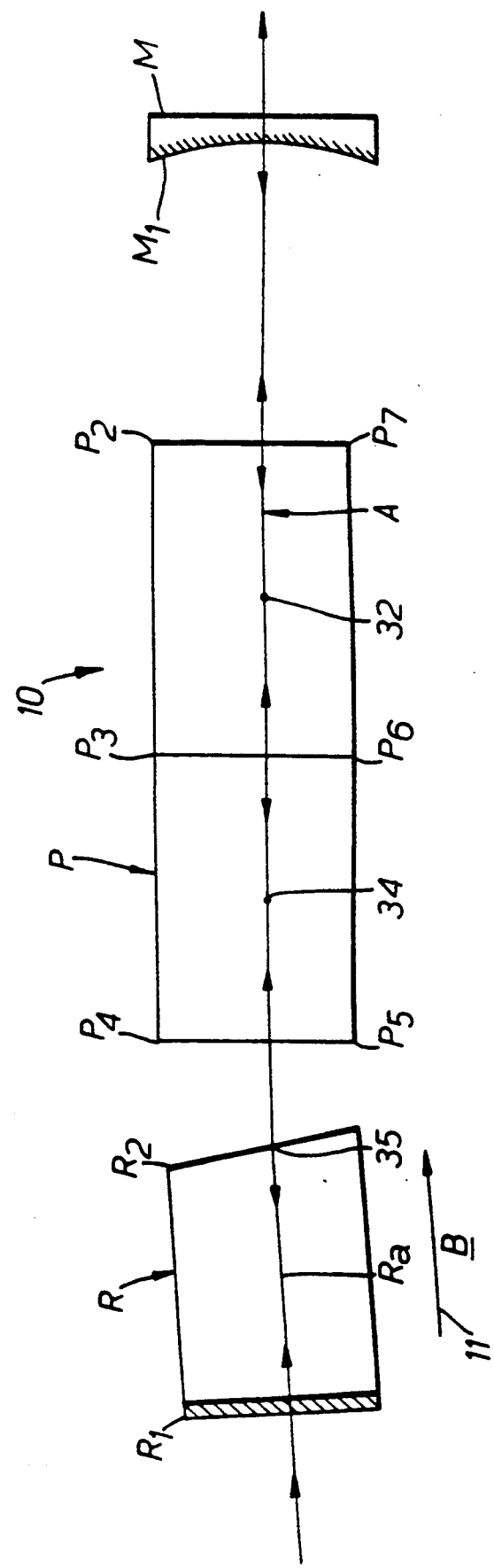

Referring to FIGS. 1 and 2, a ring laser 10 of the invention incorporates a solid cylindrical rod R of Nd:YAG laser material, a prism P of lithium niobate (LiNbO$_3$) birefringent and electro-optic material and a concave mirror M. The laser rod R is 5 mm in length and 4 mm in diameter. It has a cylinder axis $R_a$ and first and second flat end faces $R_1$ and $R_2$. The first face $R_1$ is perpendicular to the axis $R_a$. It is coated (as indicated by shading) to produce high transmission at a pump laser-wavelength of 0.808 microns (approximately) and reflectivity of 99.8% (i.e. as close as possible to 100%) at a laser operating wavelength of 1.06 microns. It provides a first cavity end mirror. The second face $R_2$ has an antireflection coating (not shown) providing high transmission at 1.06 microns. It is tilted to the perpendicular to the axis $R_a$ by an angle of 1°. The tilt is exaggerated in FIGS. 1 and 2 for clarity.

The prism P has upper apices $P_1$ to $P_4$ and lower apices $P_5$ to $P_7$. An eighth apex is present but not visible in the elevations shown. The prism P is of constant rhombic cross-section, as indicated by a rhombic horizontal upper face $P_1P_2P_3P_4$ and rectangular vertical side faces such as $P_3P_4P_5P_6$. It has rhombus edges such as $P_1P_2$ 10 mm in length. Rectangular edges such as $P_4P_5$ are 5 mm in length. The optic axis of the prism P lies along a line $P_a$. The rhombus angles of the prism P are 106° and 74° at apices such as $P_1$ and $P_2$ respectively. The rectangular prism surfaces such as $P_3P_4P_5P_6$ are polished to a flatness of one tenth of the laser operating wavelength. The rhombic faces $P_1P_2P_3P_4$ and $P_5P_6P_7$ of the prism bear respective electrodes (not shown) to allow a voltage to be applied across the prism perpendicular to the plane of FIG. 1.

The mirror M has a concave surface $M_1$ which is coated to provide 95% reflectivity at 1.06 microns, the laser operating wavelength. This provides for the mirror M to act as an optical output coupler for laser radiation. The surface $M_1$ has a radius of curvature of 75 mm and a diameter of 12.7 mm. It provides the second cavity end mirror, and gives laser cavity stability.

The laser rod R is arranged in a magnetic field B indicated by an arrow 11 and directed parallel to the rod axis $R_a$. In the present example B is 0.18 Tesla. It is supplied by a samarium-cobalt ring magnet (not shown) of 5 mm length, 10 mm internal diameter and 50 mm outer diameter arranged around the laser rod R.

The centre of the prism P is 12.2 mm from the rod face $R_2$ and 17.2 mm from the centre of the mirror $M_1$ as shown in FIG. 1. The centres of the prism P and mirror M (not shown) lie on a line A, which intersects and thereby forms a plane (that of FIG. 2) with the laser rod axis $R_a$. In FIG. 1, A and $R_a$ appear collinear, but in fact they are inclined to one another as indicated in FIG. 2 because the laser rod R is tilted slightly. The purpose of this is to accommodate refraction of laser radiation at the second rod end face $R_2$. It provides for light rays in a plane defined by rod axis $R_a$ and the normal to FIG. 2 to be refracted into a plane perpendicular to the plane of FIG. 2 and containing the line A.

In operation, the ring laser 10 is optically coupled to a pump laser (not shown) comprising an array of laser diodes (Spectra Diode Labs SDL2430). The pump laser produces 500 mW of laser radiation at a wavelength of approximately 0.808 microns. It provides a pump beam 12 inclined at 12.8° to the laser rod axis $R_a$ externally of the rod R. The pump beam 12 is refracted towards the normal at the first cavity end mirror—i.e. rod end face $R_1$. Refraction is along a path 14 to the antireflection coated rod end face $R_2$. The pump beam wavelength of 0.808 microns is strongly absorbed by the Nd:YAG material of the laser rod R, and the pump beam intensity is consequently confined largely to the immediate vicinity of the cavity end mirror $R_1$.

The pump beam 12 produces excitation of the Nd:YAG laser rod material, and this gives rise to laser action at 1.06 microns wavelength within the resonator cavity defined by end mirrors $R_1$ and $M_1$. For reasons which will be described later, laser action is unidirectional along a path having sections 14 to 21 inclusive. Section 15 arises from refraction of radiation at 30 on rod face $R_2$, and provides for radiation to be incident at 31 on prism face $P_1P_4P_5$ at Brewster's angle $\theta_B = 65.8°$; $\theta_B$ is defined by tan $\theta_B = n_o$, the ordinary refractive index of the LiNbO$_3$ material of the prism P. Radiation is refracted at 31 along the optic axis $P_a$ of the prism material. The polarisation component of the radiation in the plane of incidence, ie. in the plane of FIG. 1, is transmitted along $P_a$ without reflection loss. The polarization component perpendicular to the plane of incidence is partially reflected out of the laser cavity at 31, and so experiences loss. Similar loss mechanisms occur later in the laser path, these collectively providing for higher gain for the polarization component in the plane of incidence at 31. In consequence, laser action is substantially restricted to this component.

Radiation refracted at 31 passes along the optic axis $P_a$ (path section 16) to a point 32 in the centre of face $P_2P_3P_6P_7$. Propagation along the optic axis $P_a$ leaves the polarization state of the radiation unaffected, and it is polarized in the plane of incidence at 32. Here it is refracted at Brewster's angle once more, and passes along path section 17 to the centre of the cavity end mirror surface $M_1$. The mirror M transmits 5% of the incident intensity to produce an output beam 40. Reflection at $M_1$ directs radiation along path section 18 to a central point 33 on prism face $P_1P_2P_7$ (not visible) and introduces a phase change of approximately 180°. Due to the phase change, the polarization state remains approximately in the plane of FIG. 1 and in the plane of incidence at 33. The radiation is incident at 33 at Brewster's angle approximately. Strictly speaking, because of the birefringence of the prism material, the Brewster's angle at 31 and 32 will differ from that at 33 (and also at 34 on face $P_3P_4P_5P_6$) because the refractive indices differ in these different directions. However, since the refractive index difference is small, the departures from Brewster's angle and consequent reflection losses will be small also. More generally, Brewster's angle effects are obtained over a range of angles. This is because the intensity of the polarization component in the plane of incidence which is reflected is at or very close to zero for a range of angles of incidence either side of Brewster's angle. Consequently, so long as the angle of incidence at 33 (and indeed at 31, 32 and 34) is within 4° of Brewster's angle, reflection of the polarization component in the plane of incidence will be negligible for the purposes of this invention. References to Brewster's angle are accordingly treated as being within 4° of Brewster's angle. However, increasing departures from Brewster's angle increases system loss which may be compensated for by increasing laser gain. The latter requires increased pump power.

After refraction at 33, radiation passes along path section 19 to the point 34 in the middle of prism face $P_3P_4P_5P_6$. The path section 19 is inclined at an angle of 57° to the optic axis $P_a$. Radiation in this path section remains linearly polarized in the plane of incidence at 33, i.e. in the plane of FIG. 1. Since the radiation is linearly polarized in this plane, there is no change in polarization state during propagation between points 33 and 34. This would not be true for radiation having polarization components both in the plane of FIG. 1 and perpendicular to it (e.g. elliptically polarized radiation). In that case, due to the birefringence phenomenon of differing refractive indices in differing directions, perpendicular components of polarization propagate at differing rates. This produces a changed polarization state by virtue of the change in relative phase between the two components.

The radiation propagating along path section 19 meets the prism face $P_3P_4P_5P_6$ at 34 at Brewster's angle, and is linearly polarized in the plane of incidence as before. It is refracted along path section 20 without reflection loss, and is incident at 35 on the antireflection coated and inclined face $R_2$ of the laser rod R. Here it is refracted towards the normal to $R_2$, and passes along a path section 21 for incidence at 36 on the cavity mirror face $R_1$. Reflection at $R_1$ introduces a phase change of about 180° and returns the polarization state to that at the beginning of the radiation path in section 14. Here amplification occurs due to excitation of the laser rod R by the pump beam 12 in a region near cavity mirror face $R_1$ where the pump beam is focussed.

The path 14 to 21 of radiation is unidirectional, and confined to one polarization state relative to the propagation direction at any point. This will now be described. The laser resonator cavity defined by end mirrors $R_1$ and $M_1$ has four eigenpolarizations, these being polarization states which are reproduced in a round trip around the cavity. A polarization state is reproduced if radiation with that polarization leaving a point such as 36 has the same polarization on returning to it. Polarizations which are not preserved can be ignored, since they give rise to at least partial reflection at the various surfaces of the prism P. They are therefore subject to high laser cavity losses and do not result in laser action.

Of the four eigenpolarizations, two are for each direction round the ring laser cavity. One such direction is shown in FIG. 1, and the other is indicated by reversing the propagation arrows of path sections 14 to 21. One eigenpolarization for each direction is approximately perpendicular to the plane of FIG. 1. Each results in reflection losses at points of refraction 31 to 34 due to the Brewster's angle requirement of polarization in the plane of incidence not being satisfied. The laser gain for these eigenpolarizations is consequently too low for laser action to arise therein. This leaves two of the four eigenpolarizations, one for each direction round the ring, and these are both polarized approximately in the plane of FIG. 1. In the absence of the magnetic field B, these two eigenpolarizations are equivalent. The effect of introducing the magnetic field combined with the out of plane geometry introduced by the tilt of rod face $R_2$ is to provide for differing degrees of loss in these two modes (eigenpolarizations). This ensures that only the lower loss mode will lase.

Differential loss arises as follows. Consider the propagation of radiation from the point 34 through the laser rod R to the point 36 on the end mirror face $R_1$ and then to the point 31. This is between points of incidence on the prism P but not through the prism. Because of refraction at the tilted transmissive rod face $R_2$, and the consequent tilt of the rod axis $R_a$ relative to the line A (see FIG. 2), a rotation of polarization of about 0.1° is introduced between prism face points 34 and 31. This will be called the "out of plane" rotation.

The magnetic field B produces rotation of polarization by virtue of the Faraday (magneto-optic) effect in the laser rod R. The degree of rotation is the vector product of the field B, the total length of the material and the material Verdet constant. In the present case, the rod R is traversed in both forward and return directions with a phase change of approximately 180° at 36 on the end mirror $R_1$. Hence the radiation experiences Faraday rotation twice for transit from 34 to 31 and the reverse. The two Faraday rotations add because of the phase change at 36. In consequence, Faraday rotation is approximately equivalent to that from twice the length of rod.

In the present example, B=0.18 tesla, which results in a total Faraday rotation of approximately 0.19°. For one direction of propagation the polarization rotations (Faraday and out-of-plane) tend to counteract one another. For the opposite propagation direction these rotations add. In both cases a component of polarization arises which is perpendicular to the plane of incidence at each of the prism points 1 to 34. This component will be larger for the propagation direction in which rotations are additive. It will result in greater loss because of partial reflection at the prism. Provided that the loss difference between the two propagation directions is sufficiently large, i.e. in the region of 0.005% or above, then laser oscillation will occur only in the lower loss direction. Ideally, the Faraday and out of plane polarization rotations should be matched by, for example, adjusting the magnetic field strength. This provides for the lasing eigenmode to avoid losses at prism faces due to residual rotation. It also provides for the laser output to be polarized in the plane of FIG. 2.

By virtue of supporting a single lasing eigenmode, the laser 10 is unidirectional, and produces a travelling light wave propagating in the direction of the arrows on path sections 14 to 21 in FIG. 1. There is no standing wave, since this would require a counterpropagating wave which does not lase as previously described. Spatial hole burning occurs to a very small extent in the region of the laser rod R close to the mirror $R_1$ where light beams overlap. The extent of the overlap is governed by laser mode spot size and the angle between the beams (i.e. path sections 14 and 21). In the laser 10, overlap is very small and does not give rise to multimode operation.

The foregoing analysis has been simplified for brevity. In practice, the undirectional laser radiation shown in FIG. 1 will not be exactly linearly polarized in the plane of that drawing. It will however be very close to this condition, and will be the lowest loss or highest gain eigenmode of the laser 10. This is sufficient to ensure undirectional lasing in a single longitudinal mode of the laser cavity.

Figure 3:
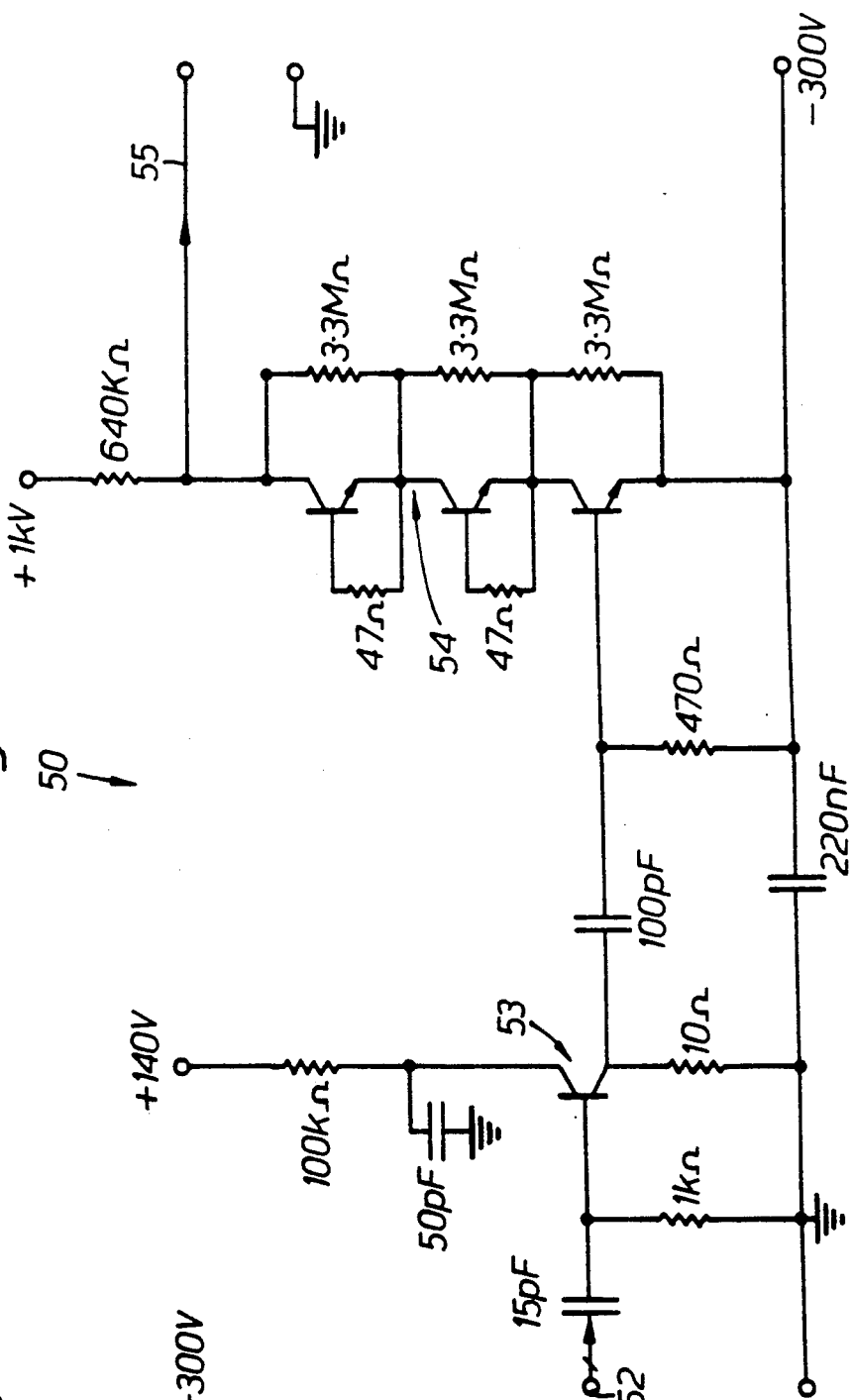
FIG. 3 is a circuit diagram of a pulse generator for use in Q-switching the laser of FIGS. 1 and 2.
Figure 4:
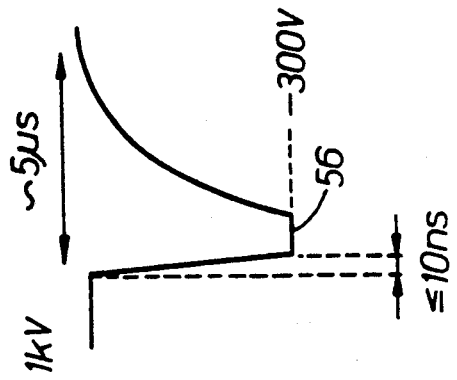
FIG. 4 is an output pulse waveform of the FIG. 3 pulse generator.

The laser 10 is arranged for Q-switched operation by virtue of the use of the prism P as a Pockels cell; the prism is of electro-optic $LiNbO_3$ material and is employed with electrical biassing apparatus. This apparatus comprises electrodes on upper and lower rhombic faces $P_1P_2P_3P_4$ and $P_5P_6P_7$, together with a high voltage pulse generating circuit 50 shown in FIG. 3. The circuit 50 is of known kind. A similar circuit is described for example by M Glotz and H J Eichler in J. Phys. E: Sci. Instrum. 20 (1987) pages 1493-96. It will not be described in detail. In brief, application of a pulse 51 to an input 52 switches on a transistor 53. The transistor 53 switches on a chain 54 of avalanche transistors (of which three are shown) to produce a rapid negative going pulse at an output 55. The pulse has the form shown at 56 in FIG. 4. It provides a voltage change across the prism P from +1 kV to −300 V in 10 nanoseconds or less. The reduction to −300 V compensates for crystal lattice relaxation effects. These would lead to incomplete recovery to a steady-state, zero-field, low-loss condition in the time scale over which the Q-switched pulse is emitted.

Prior to application of the pulse 56, the prism P has +1 kV across it, which is arranged to provide a high loss state; i.e. laser action does not take place. Th pump beam 12 excites the laser rod material until the natural de-excitation rate balances the rate at which states are excited. This maximises the population inversion. Application of the pulse 56 in effect opens the optical shutter provided by the prism P and allows optical feedback to take place. This rapidly de-excites the laser rod and results in output of an intense laser pulse (a so-called "giant" pulse) in a known manner. The laser pulse appears at 40 in FIG. 1, and in the present example is about 17 nanoseconds in pulse length. The laser pulse repetition rate may be up to 10 kHz.

The laser 10 may be modified by replacing the electro-optic prism P by a glass prism having a refractive index which is independent of propagation direction. In this case it is possible to achieve accurate Brewster's angle incidence at the equivalent of points 31 to 34 in FIG. 1 employing rhomb angles 74° and 106° as shown.

The laser incorporating such a glass prism would be operative in a continuous mode only in absence of other Q-switching means.

The laser 10 of FIGS. 1 and 2 and the glass prism equivalent are particularly straightforward to align. In both cases, the combination of the laser rod R and mirror $M_1$ are first aligned with the prism absent. This requires the pump laser to be collimated and focussed in a known manner, and then the laser rod R is arranged with its axis $R_a$ at the correct inclination to the pump beam 12, i.e. 12.8° in FIG. 1. The geometry in FIG. 1 is in fact dictated by the pump beam/rod axis angle and the prism rhomb angles. The length of the laser 10 may be changed by altering these, and the prism apices $P_4P_5$ and/or $P_2P_7$ ground down or flattened to accommodate a closer laser rod R or mirror M.

The pump laser beam 12 is focussed within the rod R close to the cavity end mirror face $R_1$, which assists obtaining a single transverse mode of laser operation. The mirror M is then adjusted to produce laser action with the rod R in the absence of the prism P. This is achieved by successive movements of the concave cavity end mirror M in the plane of FIG. 1 with intervening movements perpendicular to that plane. This is carried out until lasing is obtained. Fine adjustments are then made to maximise laser output intensity. For example, the mirror inclination and the position of the laser pump focus relative to the laser rod R are adjusted. This positions the pump focus inside the laser rod R close to the cavity end mirror face $R_1$. In addition, the mirror separation from the laser rod R is adjusted to provide room to accommodate the prism P.

The prism P is then inserted into the laser cavity. Prior to insertion, bidirectional laser action takes place along the line A and axis $R_a$. After prism insertion and subsequent adjustment, the forward and return paths between the rod R and mirror M (sections 14 to 17 and 18 to 21 respectively) become separated to provide the double loop or approximate figure of eight of FIG. 1.

Considering first the use of a glass prism P, this is inserted as nearly as possible in the position shown in FIG. 1. It is then rotated back and forth about an axis through its centre of gravity and perpendicular to rhombic faces such as $P_1P_2P_3P_4$, i.e. perpendicular to the plane of FIG. 1. Laser action occurs in the region of the correct setting. After laser action is obtained, the prism is finely adjusted for maximum laser output. There is therefore only one adjustment required if a glass prism is employed, i.e. obtaining the correct position by rotation in the plane of FIG. 1.

Using an $LiNbO_3$ electro-optic prism P, in addition to rotation in the plane of FIG. 1 it is necessary to rotate in the plane of FIG. 2, i.e. about an axis in the plane of FIG. 1 perpendicular to the line A. The procedure is to set a prism angle in the plane of FIG. 2 and sweep through angles in that of FIG. 1. If no laser action is obtained, the prism angle in the plane of FIG. 2 is reset and the procedure repeated. This is carried out until laser action is obtained, after which fine adjustment is employed to maximise laser intensity. The procedure amounts to repeating the glass prism alignment process for several prism inclinations in the orthogonal dimension. The reason for alignment in two mutually orthogonal dimensions is to provide for light propagation along the optic axis $P_a$ at path section 16 and in the plane of this axis at path section 19.

Figure 5:
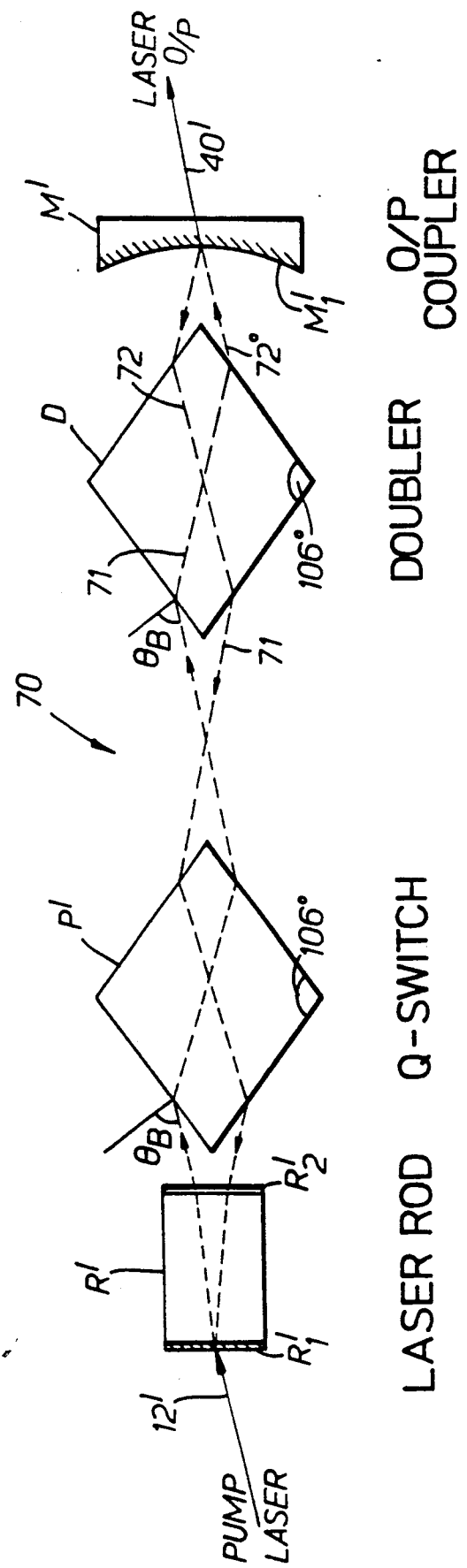
FIG. 5 is an alternative embodiment of a laser of the invention incorporating two prisms and arranged for Q-switched and frequency doubled operation.

The alignment technique is a straightforward procedure which gives rise to no difficulty to those of ordinary skill in optics. It is a logical step by step process only requiring adjustment of a physically small movable component. Referring now to FIG. 5, a further embodiment of the invention is shown in the form of a laser 70 arranged to provide a frequency-doubled output. Parts equivalent to those previously described are like-referenced with a superscript prime symbol. The laser 70 is equivalent to the laser 10 with an additional prism D inserted to the right of the prism P', mirror M' being shifted to the right to accommodate the extra prism.

The prism P' is employed for Q-switching as described earlier. The prism D introduces an additional double loop 71, 72 in the forward and return paths between cavity end mirrors $R_1'$ and $M_1'$. It has geometry and dimensions (rhombic) equal to those of the prism P', and is of like $LiNbO_3$ material. Its optic axis (not shown) is however perpendicular to both directions of radiation propagation therein; i.e. the optic axis is perpendicular to the plane of the drawing. In consequence, the prism D acts as a frequency doubler. The laser cavity radiation wavelength of 1.06 microns (near infra-red) is therefore converted to 0.53 microns (visible green) in the prism D. Incidence of radiation at each prism surface is at Brewster's angle as accurately as possible as before. The cavity end mirror surface $M_1'$ is coated for reflection at 1.06 microns and transmission at 0.53 microns. The output beam 40' is therefore visible radiation. It is pulsed if the laser 70 is Q-switched with the aid of the prism P' as described in relation to FIGS. 1 and 2. If the prism P' is omitted, and the remaining elements R', D and M' arranged as in FIGS. 1 and 2, continuous operation may be obtained.

Figure 6:
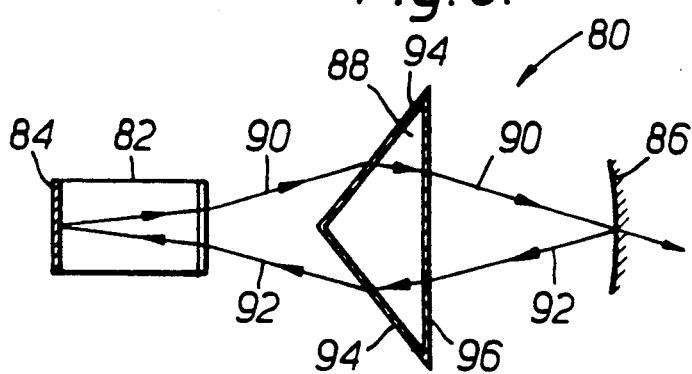
FIG. 6 schematically illustrates an embodiment of the invention incorporating a prism with antireflection-coated surfaces.

Referring now to FIG. 6, there is schematically shown a further alternative embodiment 80 of a laser of the invention. It incorporates a laser rod 82 with a reflecting end face 84 and a concave cavity end mirror 86, equivalent to the rod R and mirror M of the laser 10. Unlike the laser 10 however, instead of a rhombic prism, a triangular cross-section prism 88 is interposed between the rod 82 and mirror 86 to define separated non-intersecting forward and return optical paths 90 and 92 respectively. The paths 90 and 92 are on mutually opposite sides of a centre line (not shown) of the plan view illustrated.

The prism 88 does not present surfaces inclined at Brewster's angle to incident intracavity laser radiation. To avoid significant reflection losses which would otherwise occur, the prism 88 has dielectric antireflection coatings 94 and 96 on oblique and transverse surfaces respectively. The coatings 94 and 96 differ in composition to accommodate differences in angles of incidence at the oblique and transverse surfaces. This provides for refraction of intracavity laser radiation of appropriate polarization without significant reflection loss. The coatings 94 and 96 therefore provide the prism 88 with low-loss optical surfaces without the need to employ the Brewster's angle geometry of earlier embodiments. In other respects, the laser 80 is not greatly dissimilar to the laser 10 and will not be described further.

Figure 7:
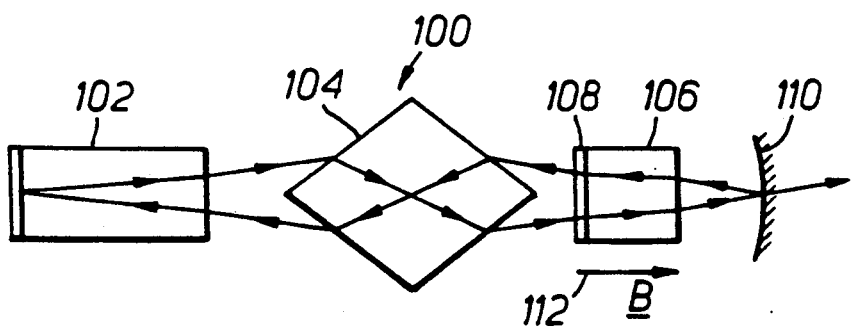
FIG. 7 illustrates separation of the laser medium and Faraday rotation functions.

Referring now to FIG. 7, an embodiment 100 of the invention is shown which employs an alternative means for obtaining out-of-plane geometry. The laser 100 has a laser rod 102, a rhombic prism 104, a cylinder 106 with a tilted end face 108, and a concave mirror 110. A magnetic field B is applied to the cylinder 106 along its axis of symmetry in the direction of an arrow 112. The cylinder 106 introduces out-of-plane geometry by virtue of its tilted face 108. It also produces Faraday rotation.

The laser 100 is therefore similar to that of FIG. 1, the main differences being that the laser rod 102 does not provide the out-of-plane and Faraday rotation functions, these being supplied by the cylinder 106. This arrangement has an advantage in the case of a laser medium which does not exhibit the Faraday effect, or which has too small a Verdet constant. It may also be necessary for a birefringent laser medium such as Nd:YLF.

FIGS. 6 and 7 illustrate some of the alternative arrangements possible within the scope of the invention. Others include use of an end mirror separate from the laser rod 82 or 102. The optical geometry may be rearranged so that the cylinder 106 lies between the rod 102 and prism 104. The functions of the cylinder 106 and mirror 110 may be combined by using a cylinder with a convex reflecting end face. It is also possible to employ a rhombic prism with antireflection coated surfaces if Brewster's angle geometry is inconvenient.

It is preferable for the same optical element to provide the functions of Faraday rotation and out-of-plane geometry, i.e. the rods R in FIGS. 1 and 6 and the cylinder 106 in FIG. 7. If these functions were to be provided by separate elements, polarization could be influenced undesirably in transit between the elements. Combination of these functions in one element minimises the loss of the lowest loss eigenmode and maximises the loss difference compared to the counterpropagating eigenmode.

FIGS. 1 to 7 illustrate the use of one or more prisms to define differing forward and return optical paths between two end mirrors of a laser cavity in accordance with the invention. In each case, the forward and return paths extend generally longitudinally of the cavity. The transverse excursions are small, unlike prior art triangular ring lasers. Since the or each prism is discrete and removable, alignment in successive stages is straightforward as described for example in relation to FIG. 1.

The FIG. 1 embodiment, i.e. the laser 10, employed a tilt of 1° of the laser rod face $R_2$ to achieve a polarization state change. A similar effect may be achieved using a rod with an untilted face $R_2$, and instead tilting the rhombic prism P. The prism tilt is through small angles (less than 1°) both perpendicular to and in the plane of FIG. 1, in the case of a birefringent prism P. As a further alternative, instead of a tilted rod face $R_2$, a voltage may be applied across the prism P to change the polarization state of one eigenmode relative to the other so that one mode undergoes greater loss at prism surfaces. In this case the prism is also used as a Pockels cell.

When operated in a Q-switched mode, embodiments of the invention are preferably arranged for unidirectional pre-lasing. This is a known preliminary operating regime commonly provided for prior to Q-switching. It consists of arranging for intracavity loss to be at an intermediate value just sufficient to allow low-level lasing to take place. It is achieved by operating the Pockels cell prism P at slightly below the 1 kV hold-off voltage. When Q-switching is initiated, the giant Q-switched pulse builds up from the pre-lase mode rather than from noise as is more usual. Pre-lasing provides better discrimination between eigenmodes of the laser resonator cavity which only differ in loss (or gain) by a small amount. It is a standard technique used in single frequency, Q-switched lasers. If pre-lasing is not employed or is not unidirectional then bidirectional, multimode Q-switched operation normally results.

It is advantageous to increase the loss difference between eigenmodes above that quoted for the embodiment of FIG. 1. A larger loss difference provides for unidirectionality to be less prone to disruption by minor optical imperfections or changes. Faraday rotation in the laser 10 may be increased to 0.34° by the use of an 0.33 tesla field B. The tilt angle of the rod face $R_2$ is then increased to 3° to achieve conformity. This produces a loss difference of 0.02% or more with an $LiNbO_3$ prism P.

The invention may incorporate means for Q-switching other than an electro-optic device (prism P). One alternative is to employ an acousto-optic prism material such as lead molybdate. An ultrasonic wave launched in a prism P of acousto-optic material sets up an optical phase grating. The grating diffracts a portion of the laser beam out of the resonator. It thereby increases the overall cavity loss and holds off oscillation. Removal of the ultrasonic wave eliminates the phase grating and restores the cavity Q-value with consequent Q-switched pulse output.

Alternative embodiments of the invention might incorporate cavity end mirrors both of which are separate and distinct from the laser medium. For example, laser rod end face $R_1$ could be coated for high transmission and its cavity end mirror function replaced by a plane mirror separate from the rod. This facilitates interchangeability of gain media, but has the disadvantage of increasing optical losses due to the increased number of surfaces. However, this disadvantage might be acceptable in implementations of the invention with interchangeable prisms for selectable function capability.

We claim:

1. A ring laser having a resonator cavity, said cavity defined by two end mirrors at mutually opposite ends of the cavity, and a gain medium within the cavity wherein said laser also includes at least one adjustable prism arranged between and adjustable with respect to both the end mirrors to enable establishment of said forward and return paths without altering the relative position of said two end mirrors to present low loss refracting surfaces and to, said at least one adjustable prism comprising means for defining differing forward and return paths through the prism for cavity radiation propagating from one end mirror to the other end mirror and returning.

2. A laser according to claim 1 wherein said laser further includes means for producing reciprocal and non-reciprocal polarization rotations which are mutually counteracting for one propagation direction around the cavity.

3. A laser according to claim 2 wherein said gain medium is a laser rod exhibiting the Faraday effect, and the non-reciprocal polarization rotating means is a magnetic field directed along an axis of the rod.

4. A laser according to claim 3 wherein one of said cavity end mirrors comprise a coated outer end face on the laser rod.

5. A laser according to claim 3 wherein said means for producing reciprocal polarization rotation comprises an inner rod end face inclined to the rod axis and arranged to produce a non-planar light path.

6. A laser according to claim 2, wherein said means for producing reciprocal polarization rotation comprises a prism inclination which is asymmetric with respect to a centre line of part of the cavity.

7. A laser according claim 1 further including two prisms arranged in series along the cavity for traversal in succession on both forward and return radiation paths.

8. A laser according to claim 7 wherein the two prisms are arranged to comprise a means for Q-switching and a means for frequency doubling, respectively, said two prisms being adjustable relative to both mirrors.

9. A ring laser, said laser comprising:
a resonator cavity having two ends;
two end mirrors, one at each of said two ends of said resonator cavity;
a gain medium within said cavity; and
at least one prism, said prism being located between and adjustable with respect to said end mirrors, said prism presenting low loss refracting surfaces and said prism and end mirrors comprising a means for defining different forward and return paths for cavity radiation propagating from one end mirror to the other and returning, said prism being adjustable relative to both mirrors without altering relative position of said two end mirrors.

* * * * *

UNITED STATES PATENT AND TRADEMARK OFFICE
CERTIFICATE OF CORRECTION

PATENT NO. : 5,222,094

DATED : June 22, 1993

INVENTOR(S) : David C. Hanna and William A. Clarkson

It is certified that error appears in the above-identified patent and that said Letters Patent is hereby corrected as shown below:

Column 12, line 42, delete "and to"

Signed and Sealed this

First Day of February, 1994

Attest:

BRUCE LEHMAN

*Attesting Officer*    *Commissioner of Patents and Trademarks*